INVENTOR.
Joseph D. Wood
BY
Ostrolenk & Faber
ATTORNEYS

Patented Feb. 28, 1950

2,499,082

UNITED STATES PATENT OFFICE 2,499,082

SERIES TIME-DELAY MECHANISM

Joseph D. Wood, Upper Darby, Pa., assignor to I. T. E. Circuit Breaker Company, Philadelphia, Pa., a corporation of Pennsylvania Application October 19, 1945, Serial No. 623,370

6 Claims. (Cl. 175—372)

My invention relates to circuit breakers and more specifically to novel tripping devices therefor adapted to be used in a system of circuit breakers arranged for sequential tripping over the entire protective range of the circuit breakers including the short circuit current ranges.

More specifically, my invention relates to a novel tripping device provided with direct acting overload elements which may be adjusted to secure sequential tripping with respect to other breakers in the system.

In distribution systems within, for instance, a large industrial plant, the power enters the plant through a main circuit breaker to the main distribution switchboard and is there fed out on a number of feeder circuits each protected by a circuit breaker. These feeders may each go to large loads. Some, or all, however, may go to additional distribution switchboards where they are again divided into smaller distribution circuits. Each of these circuits may in turn go to load centers or power panels for distribution of the energy to a multiplicity of loads.

Distribution systems of this type (of which a simplified diagrammatic illustration is hereinafter shown in the figures) are utilized not only in most industrial plants, but also wherever a large quantity of apparatus in a relatively compact unit must be operated from a central power source.

In such distribution systems, the fault current due to fault or short circuit conditions in one of the feeder circuits, or even in one of the load circuits, passes through several breakers in series and may result not merely in a tripping of the circuit breaker protecting that particular load, but in a tripping of each of the circuit breakers back of and in series with that particular circuit breaker back to the source, so that one of the main feeder breakers, or even the main breaker itself, may be tripped and thus disconnect the entire distribution system.

Accordingly, the primary problem to which this invention is directed is the construction and arrangement of such circuit breakers in a distribution system in such a novel manner that high speed selective tripping will occur, and so that the circuit breaker nearest the fault will be operative to clear an overcurrent, fault, or short circuit condition on the particular circuit it is protecting before the circuit breakers between it and the source can complete a tripping operation, and so that each circuit breaker in the system will be protected by the circuit breaker immediately behind it toward the source.

More specifically, I have invented a novel tripping device peculiarly adapted for use in a system in which the overload mechanisms of the circuit breakers in the system are so adjusted that the smallest circuit breakers for protecting the individual loads have a higher speed trip characteristic than other breakers in series with them, up to their maximum interrupting capacity. At or below maximum interruping capacity of these load breakers, the adjustment of the overload mechanism of the adjacent circuit breaker in series with the load unit breaker (toward the source) becomes quick acting to trip its associated circuit breakers quickly and therefore protects the smaller load breaker. The overload mechanism of this adjacent circuit breaker is in turn adjusted to trip its associated breaker faster than the next circuit breaker (toward the source) in the series circuit thereby preventing tripping of this next circuit breaker at short circuit values approximately up to or below the maximum interrupting capacity of the preceding circuit breaker. This last circuit breaker is, in turn, tripped substantially instantaneously at short circuit currents of values substantially equal to or below the maximum interrupting capacity of the circuit breaker adjacent it toward the load.

In sequential tripping systems heretofore employed, the time separation between the various circuit breakers in the system has been effected by the provision of relays which have been set to various time delays and which, on operation, energize the shunt trip coils. Such systems are either very expensive and involved or can only provide sequential operation by timed intervals in the range of seconds since it is necessary in such a system that the relay first be energized sufficiently long to pull up its armature to close its contacts. When the armature has been moved to the energized position, and then only, does it energize the shunt trip coil which in turn must operate a second armature to operate the trip mechanism. Where instantaneous features were added, as was often the case, all circuit breakers in the sequence would open thus losing continuity of service.

I have discovered that I can secure sequential tripping of circuit breakers in a power system not only in the overload current ranges such as may occur in motor starting circuits, but also in the range of short circuit currents where the tripping must be substantially instantaneous.

This I effect by providing overload devices having an inverse time ratio which may substantially simulate the heating conditions of a load such as a motor to provide a time delay trip for the protection of such a load. This is followed by a quick trip protection at greater overload conditions such as at two to ten times the overload value of the particular breakers with a short inverse time or definite minimum time characteristic. In addition, a more definite ratio can be obtained by saturation of the magnetic circuit in the overload device.

Finally there is provided an instantaneous trip mechanism individual to each of said breakers. This latter is so arranged with respect to each of the other circuit breaker trip curves that each of the larger breakers (in a cascaded system) has substantially the same instantaneous tripping time as the next smaller breaker at the interrupting capacity of that smaller breaker.

At less than this interrupting capacity each of the quick trip mechanisms, however, has a slightly slower tripping operation measurable in terms of a few cycles than the next smaller circuit breaker so that sequential tripping is still effected in such a short circuit current range close to maximum interrupting capacity of the breakers of the system.

A primary object of my invention, therefore, is the provision of a novel tripping device for a circuit breaker which will be selectively responsive at different speeds to different types of overload and short circuit.

Another object of my invention is the provision of a time delay device for a circuit breaker tripping mechanism wherein a single unitary time delay element may be provided with a plurality of independent adjustments for various time delays under different loads.

Still another object of my invention is the provision of a novel time delay device for the tripping elements of a circuit breaker which will adapt the circuit breaker for use in a sequential tripping system of the character above set forth.

Another object of my invention is the provision of a time delay device arranged to have characteristic curves for protecting normal overloads, such as starting current in motor circuits, while at the same time it has other characteristic curves for protection against various more excessive loads up to and including short circuits.

Another object of my invention is the provision of a novel time delay device for use in connection with tripping elements of circuit breakers arranged in a sequential tripping system in which both long time delay periods and quick trip operating periods are obtainable.

In a preferred form of my invention, a single armature is used with time delay devices comprising normally stationary masses which may be rotated. The energy required to overcome the inertia of these masses to bring them into rotational movement furnishes the necessary time delay. The time delay device, however, is so arranged that two such masses are initially used for a relatively long time delay at relatively low overcurrent conditions. Where a shorter time delay is required at a relatively heavy overload condition, one of these masses is mechanically by-passed and the armature is subject only to the time delay interposed by the inertia of the light of these masses. Where an instantaneous trip is desired, both of these masses are mechanically by-passed and no time delay occurs.

The foregoing and many other objects of my invention will become apparent from the following description and drawings in which Figure 1 is a schematic diagram of a group of circuit breakers in a typical distribution system.

Figures 1, 2:
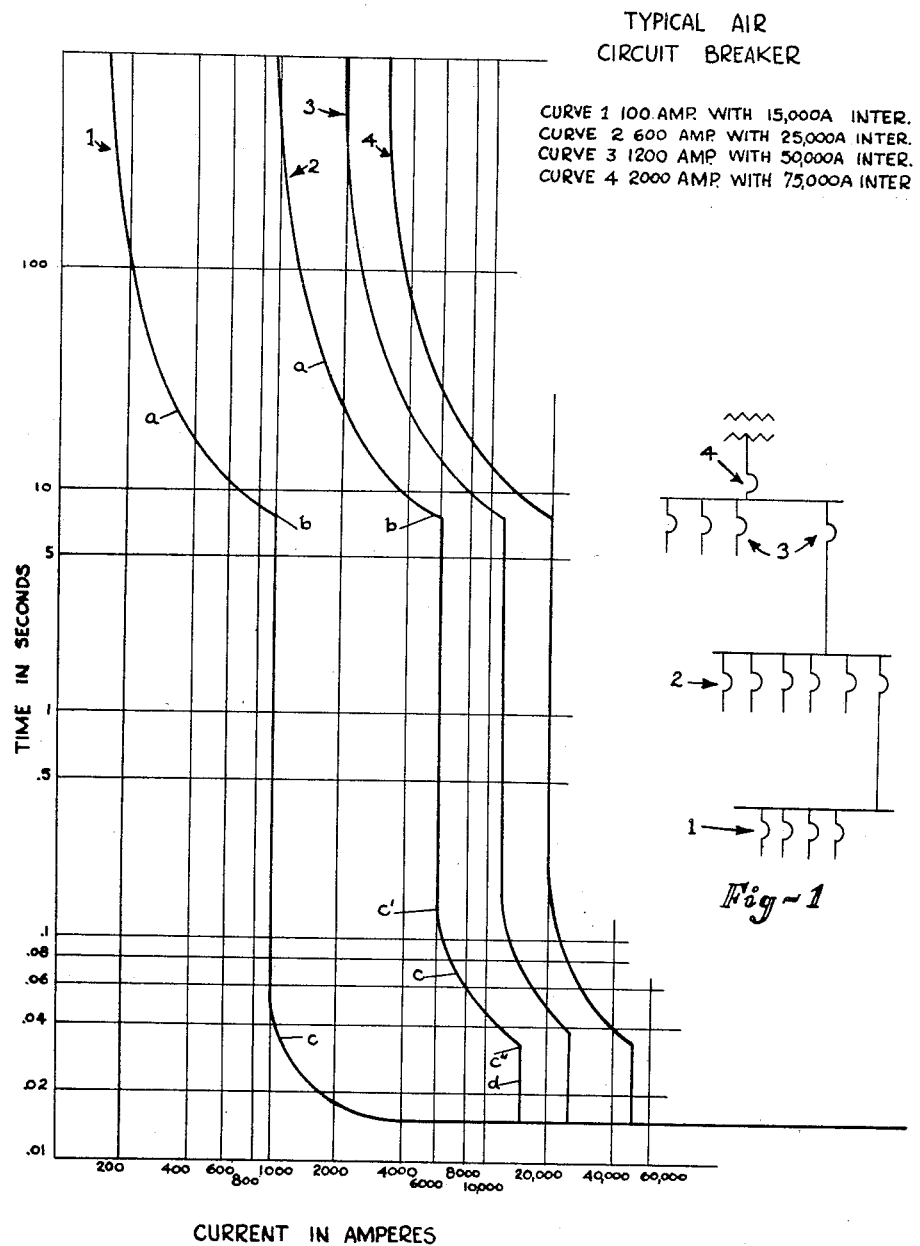
Figure 2 is a graph showing the tripping characteristics of each of the circuit breakers in the group.

Referring now to Figures 1 and 2, I have here shown a typical distribution system having a plurality of circuit breakers together with a graph showing the tripping characteristics thereof. In this distribution system, the electrical energy is distributed at a utilization voltage of 440 volts, the various interrupting capacities for each of the breakers are shown in the curves.

The power enters the main plant by the circuit breaker 4, and then passes to a main distribution switchboard whence it is fed out on a number of feeder breakers 3. These feeders may each go to large loads. Some, or all, however, may go to additional distribution switchboards where they are again divided into a plurality of small distribution circuits to which energy is fed out over the circuit breakers 2. Each of these circuits may in turn go to load centers or power panels for distribution of the energy over the circuit breakers 1 to a multiplicity of loads.

Figure 3:
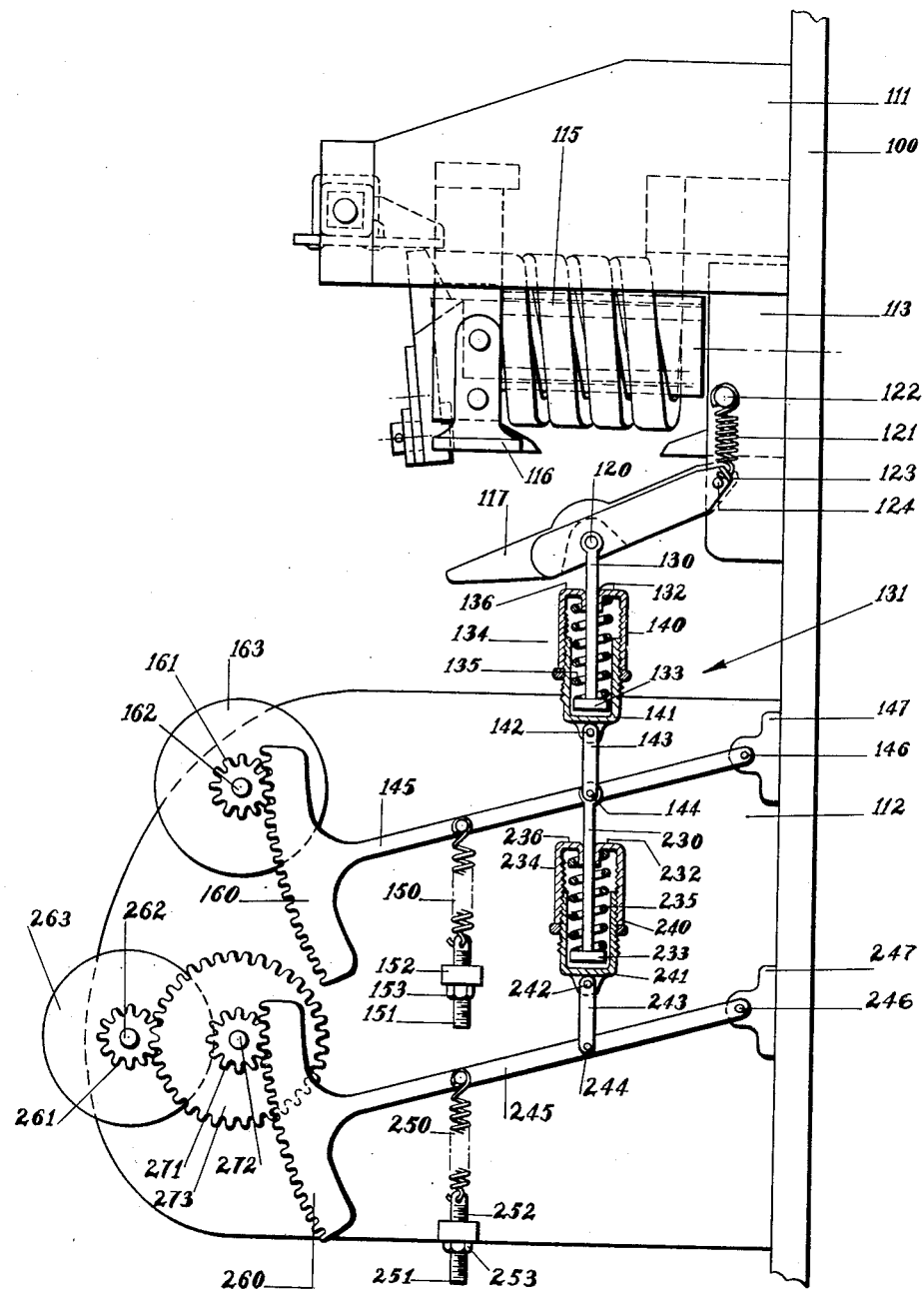
Figure 3 is a somewhat schematic side view, partly in section, of my novel time delay device which utilizes the inertia of a plurality of masses to obtain the various time delays required and which utilizes a mechanical by-pass to eliminate the inertia of one or all of these masses.

In Figure 3 the circuit breaker panel 100 has secured thereto appropriate frame elements 111, 112, 113 to carry the various elements of the trip device. A series trip coil 115 energizes a magnet 116 which attracts the armature 117. Armature 117 is pivotally mounted on the pin 124 and bears the extension 123 through which passes one end of the spring 121. The other end of spring 121 is attached to the extension 123. Spring 121 prevents the armature from chattering when the circuit breaker is used on alternating current.

The pin 120 of armature 117 is connected to the link 130 of the time delay unit indicated generally at 131. Link 130 is provided with an annular flange 133 at its lower end. The link 130 passes through an opening 132 in the adjustable housing 134 for compression spring 135. Compression spring 135 is captured between the upper wall 136, having the opening 132, of the housing 134 and the flange 133 of link 130.

Housing 134 is a compound unit having an upper housing portion 140 internally threaded and a lower housing portion 141 having an external thread adapted to be screwed into the lower end of housing section 140. Upper housing section 140 may thus be rotated on lower housing section 141 to move the top wall 136 of the upper housing 140 down and thus change the compression of the spring 135. The lower housing section 141 is connected by the pin 142 to the link 143 which, in turn, is connected to the pin 144.

Pin 144 is carried on arm 145 which is pivotally mounted at 146 on the bracket 147 carried by frame 112. Pin 144 also carries link 230 which passes through opening 232 in the top wall 236 of housing 234. Link 230 has a flange 233 at its lower end, and compression spring 235 is captured by the flange 233 and the upper wall 236 of housing 234.

Rotation of the upper housing section 240 with respect to the lower housing section 241 will result in an adjustment of the compression of spring 235.

Lower housing section 241 of housing 234 is connected by the pin 242 to the link 243 which is connected to the pin 244 carried by the arm 245. Arm 245 is pivotally mounted at 246 on the bracket 247 carried by the frame 112.

Each of the arms 145 and 245 is independently biased in the downward position by the adjustably tensioned springs 150 and 250 respectively, the tensions of which may be adjusted respectively by rotation of screws 151 and 251 in the stationary nuts 152 and 252; and the adjustments may be locked respectively by the lock nuts 153 and 253.

Arm 145 at its outer end carries the rack 160 engaging the pinion 161 on the shaft 162 carried by the frame 112. Weight 163 is keyed to the shaft 162 and rotatable therewith. Arm 245 carries at its outer end the rack 260 which engages pinion 271 on the shaft 272. Gear 273 is keyed to the shaft 272 and rotatable therewith. Gear 273 meshes with pinion 261 on shaft 262 carried by frame 112. Weight 263 is keyed to shaft 262 and rotatable therewith.

When the circuit breaker is subject to relatively low overloads of the order of two to ten times normal, both of the springs 135 and 235 are substantially incompressible and act as solid bars, that is, the armature is not attracted with sufficient force to compress either of these two springs. Accordingly, when the armature 117 is thus attracted by a relatively low overload, link 130 is drawn up with the armature 117 pulling up its flange 133, pushing against spring 135 to push up the housing 134, and thus pulling on link 143 to pull up the arm 145. Pulling up of arm 145 results in pulling up of link 230, thus pulling up its flange 233 to act through the (at present) incompressible spring 235 to push up the housing 240 to pull up the link 243 and pull up the arm 245.

Since arm 145 is connected through the rack and pinion arrangement to the rotatable weight 163, the inertia of weight 163 acts as a time delay for the movement of the armature 117. Further, since the rack 260 of arm 245 is connected by the gears 271, 272, 273 to pinion 261 of the rotatable weight 263, the mass of the rotatable weight 263 as well as of the large gear 273 offers additional inertia to the movement of the armature 117.

Accordingly, at low overloads, the movement of the armature is slowed up by the inertia of masses 163 and 263, the additional mass of gear 273 and the masses of arms 145 and 245 with their associated racks.

Spring 235 is calibrated so that on a heavy overload but less than short circuit, it will be compressed while spring 135 is calibrated so that it will not be compressed on a heavy overload less than short circuit. Accordingly, when the armature 117 acted upon by a heavy overload greater than the overload previously described, i. e., more than ten times normal but less than short circuit, then since spring 135 is still incompressible, forces will still be transmitted through spring 134, 135, 143 to 145. Arm 145 will be pulled up and the inertia of mass 163 will offer a time delay. Since, however, spring 235 is compressible at this heavy overload, the pull on flange 233 will compress this spring so that link 230 will move to follow the armature 117 movement although arm 245 is held back by the inertia of mass 263 and the large gear 273. Accordingly, mass 263, large gear 273 and the mass of arm 245 and its associated rack will be mechanically shunted out by the compression of spring 235, and the relatively short time delay interposed only by mass 163 will be effective.

Spring 135 is adjusted so that it will be compressible at short circuit currents or interrupting currents at the maximum capacity of the circuit breaker. Accordingly, when the armature 117 is rapidly attracted by the extreme force of a short circuit current, spring 135 will be compressed. Flange 133 of link 130 will thus be able to move up even though housing 134 remains stationary and before the mass 163 begins to move. Therefore, the compression of spring 135 under the force exerted by a short circuit will mechanically shunt out mass 163 as well as mass 263 and all of the associated elements including the arms 145 and 245 which operate these masses.

The operation of the armature 117 in the relatively low overload range where springs 175 and 235 are incompressible corresponds therefore to the operation shown at section A of curve 2 of Figure 2.

When a heavy overload occurs, compressing spring 235 so that only the relatively lighter mass 163 interposes its inertia to the movement of the armature, the operation of the armature corresponds to section C of curve 2 of Figure 2.

When the spring 135 is compressed by a short circuit, the instantaneous operation of the armature 117 corresponds to section D of curve 2 of Figure 2.

By this means, therefore, three species of time delay are obtained by the single mechanism: a long time delay by reason of the fact that masses 163 and 263 restrain the armature at low overcurrent values; a short time delay or relatively quick trip operation which is obtained when the attractive force of the armature 117 is sufficient to compress spring 235 and thereby disconnect the armature from the mass 263, arm 245 and associated elements; and an instantaneous trip with no time delay when the attractive force of the armature 117 is sufficient to overcome the force of the heavy spring 135 thereby disconnecting the armature 117 from both time delay masses 163 and 263, their associated arms 145 and 245 and other associated elements.

The device herein is shown schematically as above pointed out. It is obvious, however, that the elements may be much more compact when arranged for actual operation. Thus, for instance, the gear sectors 160 and 260 may be arranged to have inside teeth on an annular flange rather than outside teeth permitting greater compactness of the device. Making the device compact can be done by a series of obvious mechanical expedients well known to those skilled in the art.

In the foregoing I have described my invention solely in connection with a specific embodiment thereof and in connection with a system with which it is adapted to be utilized. Since many variations and modifications of my invention should now be obvious to those skilled in the art, I prefer to be bound not by the specific description herein contained but only by the appended claims.

I claim:

1. In a time delay mechanism for a circuit breaker trip apparatus having an armature mounted for a predetermined movement and a magnet for applying variable forces for effecting movement of said armature in one direction, a first time delay mechanism comprising a rotatably mounted mass, a pinion secured to and rotatable with said mass and a gear meshing with the teeth of said pinion, a member including a spring connecting said armature to said gear, said spring forming a flexible connection between said armature and said first time delay mechanism when said armature is pulled by a first predetermined force in response to the energization of said electromagnet to permit said armature to move free of said time delay mechanism and said spring acting as a rigid connection when said armature is pulled by less than said first predetermined force and at least a second predetermined force in response to the energization of said electromagnet to effect delay in the movement of said armature by said first time delay, a second time delay comprising a rotatably mounted mass, a pinion secured to and rotatable with said last mentioned rotatable mass and a gear meshing therewith, a member including a spring connection from said first time delay mechanism to said last mentioned gear, said spring forming a flexible connection between said time delay mechanism when the force applied to said armature by said magnet when energized is at least said second predetermined force and acting as a rigid connection when the force applied to said armature by said electromagnet when energized is less than said second predetermined force for permitting movement of said armature under control of said second time delay.

2. In a time delay mechanism for a circuit breaker trip apparatus having an armature mounted for a predetermined movement and a magnet for applying variable forces for effecting movement of said armature in one direction, a first time delay mechanism comprising a rotatably mounted mass, a member including a spring connecting said armature to said mass, said spring forming a flexible connection between said armature and said first time delay mechanism when said armature is pulled by a first predetermined force in response to the energization of said electromagnet to permit said armature to move free of said time delay mechanism and said spring acting as a rigid connection when said armature is pulled by less than said first predetermined force and at least a second predetermined force in response to the energization of said electromagnet to effect delay in the movement of said armature by said first time delay, a second time delay comprising a rotatably mounted mass, a member including a spring connection from said first time delay mechanism to said last mentioned mass, said spring forming a flexible connection between said time delay mechanism when the force applied to said armature by said magnet when energized is at least said second predetermined force and acting as a rigid connection when the force applied to said armature by said electromagnet when energized is less than said second predetermined force for permitting movement of said armature under control of said second time delay.

3. In a time delay mechanism for a circuit breaker trip apparatus having an armature mounted for a predetermined movement and a magnet for applying variable forces for effecting movement of said armature in one direction, a first time delay mechanism, a member including a spring connecting said armature to said first time delay mechanism, said spring forming a flexible connection between said armature and said first time delay mechanism when said armature is pulled by a first predetermined force in response to the energization of said electromagnet to permit said armature to move free of said time delay mechanism and said spring acting as a rigid connection when said armature is pulled by less than said first predetermined force and at least a second predetermined force in response to the energization of said electromagnet to effect delay in the movement of said armature by said first time delay, a second time delay, a member including a spring connection from said first time delay mechanism to said last mentioned time delay mechanism, said spring forming a flexible connection between said time delay mechanism when the force applied to said armature by said magnet when energized is at least said second predetermined force and acting as a rigid connection when the force applied to said armature by said electromagnet when energized is less than said second predetermined force for permitting movement of said armature under control of said second time delay.

4. In a time delay mechanism for a circuit breaker trip apparatus having an armature mounted for a predetermined movement and a magnet for applying variable forces for effecting movement of said armature in one direction, a first time delay mechanism comprising a rotatably mounted mass for delaying movement of said armature under control of said first time delay, a connection for connecting said first time delay mechanism to said armature, said connection being a rigid connection for currents below the currents to which said time delay responds for delaying the movement of said armature and said connection being a flexible connection for currents above said current value, a second time delay for delaying movement of said armature under control of said second time delay, a spring connecting said first and second time delays, said spring forming a flexible connection therebetween when said armature is pulled by a predetermined force in response to the energization of said electromagnet to permit said armature to move free of said second time delay mechanism and under control of said first time delay and said spring acting as a rigid connection when said armature is pulled by less than said predetermined force in response to the energization of said electromagnet to effect delay in the movement of said armature by said second time delay.

5. In a time delay mechanism for a circuit breaker trip apparatus having an armature mounted for a predetermined movement and a magnet for applying variable forces for effecting movement of said armature in one direction, a first time delay mechanism comprising a rotatably mounted mass for delaying movement of said armature under control of said first time delay, a connection for connecting said first time delay mechanism to said armature, said connection being a rigid connection for currents below the currents to which said time delay responds for delaying the movement of said armature and said connection being a flexible connection for currents above said current value, a second time delay comprising a rotatable mass for delaying movement of said armature under control of said second time delay, a spring connecting said first and second time delays, said spring forming a flexible connection therebetween when said armature is pulled by a predetermined force in response to the energization of said electromagnet to permit said armature to move free of said second time delay mechanism and under control of said first time delay and said spring acting as a rigid connection when said armature is pulled by less than said predetermined force in response to the energization of said electromagnet to effect delay in the movement of said armature by said second time delay.

6. In a time delay mechanism for a circuit breaker trip apparatus having an armature mounted for a predetermined movement and a magnet for applying variable forces for effecting movement of said armature in one direction, a first time delay mechanism for delaying movement of said armature for time periods of up to 10 cycles in response to short circuit currents under control of said first time delay, a connection for connecting said first time delay mechanism to said armature, said connection being a rigid connection for currents below the currents to which said time delay responds for delaying the movement of said armature and said connection being a flexible connection for currents above said current value, a second time delay for time periods of the order of seconds in response to overload currents for delaying movement of said armature under control of said second time delay, a spring connecting said first and second time delays, said spring forming a flexible connection therebetween when said armature is pulled by a predetermined force in response to the energization of said electromagnet to permit said armature to move free of said second time delay mechanism and under control of said first time delay and said spring acting as a rigid connection when said armature is pulled by less than said predetermined force in response to the energization of said electromagnet to effect delay in the movement of said armature by said second time delay.

JOSEPH D. WOOD.

REFERENCES CITED

The following references are of record in the file of this patent:

UNITED STATES PATENTS

| Number | Name | Date |
|---|---|---|
| 769,572 | Stewart | Sept. 6, 1904 |
| 991,108 | Turbayne | May 2, 1911 |
| 1,123,288 | Hellmund | Jan. 5, 1915 |
| 1,216,570 | Hohn | Feb. 20, 1917 |
| 1,250,746 | Wolff | Dec. 18, 1917 |
| 1,928,131 | Kuhn | Sept. 26, 1933 |
| 2,088,174 | Daullin, Jr. | July 27, 1937 |
| 2,272,950 | Mercier | Feb. 10, 1942 |
| 2,393,736 | Bennett et al. | Jan. 29, 1946 |
| 2,439,165 | Graves | Apr. 6, 1948 |

FOREIGN PATENTS

| Number | Country | Date |
|---|---|---|
| 198,482 | Switzerland | Sept. 16, 1938 |